United States Patent
Kron

(10) Patent No.: US 11,915,521 B2
(45) Date of Patent: Feb. 27, 2024

(54) ZERO DELAY GAZE FILTER

(71) Applicant: Tobii AB, Danderyd (SE)

(72) Inventor: Johannes Kron, Danderyd (SE)

(73) Assignee: Tobii AB, Danderyd (SE)

( * ) Notice: Subject to any disclaimer, the term of this patent is extended or adjusted under 35 U.S.C. 154(b) by 380 days.

(21) Appl. No.: 17/059,796

(22) PCT Filed: May 31, 2018

(86) PCT No.: PCT/EP2018/064372
§ 371 (c)(1),
(2) Date: Nov. 30, 2020

(87) PCT Pub. No.: WO2019/228633
PCT Pub. Date: Dec. 5, 2019

(65) Prior Publication Data
US 2021/0208676 A1   Jul. 8, 2021

(51) Int. Cl.
| | | |
|---|---|---|
| *G06V 40/19* | (2022.01) | |
| *G06T 7/73* | (2017.01) | |
| *G02B 27/01* | (2006.01) | |
| *G06F 3/01* | (2006.01) | |
| *G06V 10/75* | (2022.01) | |

(Continued)

(52) U.S. Cl.
CPC ......... *G06V 40/19* (2022.01); *G02B 27/0172* (2013.01); *G06F 3/013* (2013.01); *G06T 7/74* (2017.01); *G06V 10/751* (2022.01); *G06V 20/20* (2022.01); *G02B 2027/014* (2013.01); *G02B 2027/0138* (2013.01); *G02B 2027/0178* (2013.01); *G06V 40/197* (2022.01)

(58) Field of Classification Search
CPC ........ G02B 27/0172; G02B 2027/0138; G02B 2027/014; G02B 2027/0178; G06V 40/19; G06V 10/751; G06V 40/197; G06F 3/013; G06F 18/214; G06F 18/24143; G06T 7/74
USPC .......................................... 382/103
See application file for complete search history.

(56) References Cited

U.S. PATENT DOCUMENTS

| | | | |
|---|---|---|---|
| 9,671,619 B2 * | 6/2017 | Pugh | ........................ A61B 3/10 |
| 10,082,866 B2 * | 9/2018 | Ahuja | ...................... G06F 3/013 |
| 10,376,439 B2 * | 8/2019 | Nimtsovitch | ............ A61H 5/00 |

(Continued)

FOREIGN PATENT DOCUMENTS

WO   WO-2016131075 A1 *   8/2016   ......... G06K 9/00221

OTHER PUBLICATIONS

International Search Report and Written Opinion of PCT/EP2018/064372.

*Primary Examiner* — Matthew C Bella
*Assistant Examiner* — Pardis Sohraby
(74) *Attorney, Agent, or Firm* — Christopher Ignatius Moylan

(57) ABSTRACT

A method for processing a gaze signal in an eye tracking system is provided. The method comprises receiving a first image of a user's eye captured at a first point in time and a second image of the users eye captured at a second point in time subsequent to the first point in time, and determining, based on the first image and the second image, whether eye movement of the user's eye is in fixation or not. The method may further comprise to, on condition that the eye movement of the users eye is in fixation, applying a filter on the gaze signal, wherein the filter is adapted to decrease variance in the gaze signal.

14 Claims, 6 Drawing Sheets

(51) Int. Cl.
*G06V 20/20* (2022.01)
*G06V 40/18* (2022.01)

(56) References Cited

U.S. PATENT DOCUMENTS

| | | | |
|---|---|---|---|
| 2009/0086165 A1* | 4/2009 | Beymer | A61B 3/113 |
| | | | 351/210 |
| 2015/0097772 A1* | 4/2015 | Starner | G02B 27/017 |
| | | | 345/158 |
| 2015/0309567 A1* | 10/2015 | Park | G06F 3/013 |
| | | | 348/78 |
| 2018/0239423 A1* | 8/2018 | Mardanbegi | G06F 3/013 |

* cited by examiner

ZERO DELAY GAZE FILTER

TECHNICAL FIELD

The present invention generally relates to the field of eye tracking. In particular, the present invention relates to a system and a method for processing a gaze signal in an eye tracking system.

BACKGROUND

Generally, in the field of eye tracking, the quality of gaze signals refers to gaze accuracy, precision and trackability. Precision may be defined as the ability of an eye tracker to reliably reproduce the same gaze point measurement, i.e. it measures the variation of the recorded data. In practical applications, high precision is directly related to the signal-to-noise level of the image sensor as well as the overall lighting conditions. It can also be related to computational complexity tradeoffs where computational complexity is traded against eye tracking performance and precision level.

A common technique to tackle such problems is applying a low-pass filter. The implementation of a low-pass filter for gaze tracking may decrease the gaze signal noise, however, it comes at the cost of added latency to the gaze signal, since the output at a particular time is a weighted average of previous gaze samples. Thus, the eye tracking system may be considered less responsive than when not using a low-pass filter, which is undesirable for a user of the system.

Hence, there is a need for an improved method for obtaining high precision in an eye tracking system.

SUMMARY

It would be advantageous to achieve an eye-tracking method or system overcoming, or at least alleviating, the above mentioned drawbacks. In particular, it would be desirable to enable high precision eye tracking without a high added latency.

To better address one or more of these concerns, a method and a system having the features defined in the independent claims are provided. Preferable embodiments are defined in the dependent claims.

According to an aspect, a method for processing a gaze signal in an eye tracking system is provided. The method comprises receiving a first image of a user's eye captured at a first point in time and a second image of the user's eye captured at a second point in time subsequent to the first point in time, and determining, based on the first image and the second image, whether eye movement of the user's eye is in fixation or not. The method may further comprise to, on condition that the eye movement of the user's eye is in fixation, applying a filter on the gaze signal, wherein the filter is adapted to decrease variance in the gaze signal.

By determining whether the movement of the user's eye is in fixation or not, it can be determined whether to apply a filter to decrease variance in the gaze signal. In this way, the variance in the gaze signal is decreased when the movement of the user's eye is in fixation which may lead to better precision of the gaze signal and thereby the eye tracking using the gaze signal. At the same time, when the movement of the user's eye is not in fixation, no filter is added, which improves the response time of the system and does not add any delay in detection of eye movements. By adding a filter to decrease variance in the gaze signal, latency in detecting an eye movement of the user may be added. Thus, by not using the filter when the movement of the user's eye is not in fixation, e.g. when in saccade or smooth pursuit, latency may be avoided.

This is based on the realization that a filter to decrease variance in the gaze signal is beneficial to improve the precision. However, adding a filter when eye movement is expected may suppress the change in the gaze signal. This may lead to an added latency to detect such eye movements. Thus, it has been realized that by using the filter only if it has been determined that the movement of the user's eye is in fixation, the benefits of the filter may be achieved, i.e. higher precision, while still providing for a fast response time for the system to detect eye movements.

By the term "gaze signal" it may be meant any output signal or intermediate signal in an eye tracking system, such as a signal indicating an eye movement, an eye position, a pupil position or any other signal derived from the eye image.

The first and second images may be subsequent images in a stream of images, or they may be separated in time or in a stream of images. The first and second images may depict the user's eye from the same angle, or the images may be pre-processed to be corresponding to the same scene.

By "in fixation" it may be meant that the user's eye has not substantially moved since the last measurement or tracking. For example, if the eye has not moved, the eye may be in substantially the same position in the first and second images. By the user's eye "not being in fixation" it may be meant that the user's eye has moved. For example, that the eye has moved such that the pupil is in another position relative to the eye socket.

The "filter" may be any type of filter adapted to decrease variance in a signal or a set of signals.

The term "precision" may be defined as the ability of an eye tracking system to reliably reproduce the same gaze point measurement. For example, it may be measured by the variation of the recorded data via the Root Mean Square (RMS) of successive samples.

The method may further comprise to, on condition that the eye movement of the user's eye is not in fixation, refrain from applying the filter on the gaze signal, wherein the filter is adapted to decrease variance in the gaze signal. The method may further, on condition that the eye movement of the user's eye is not in fixation, comprise to refrain from applying any filter on the gaze signal adapted to decrease variance in the gaze signal. In this way, a filter for decreasing variance in the gaze signal may only be applied on the gaze signal when the eye movement of the user is in fixation, thereby allowing for a stable or accurate eye tracking when the eye movement is in fixation, while still allowing for a fast detection, i.e. low latency, of eye movements.

The filter may be a low-pass filter. The low-pass filter may, for example, be a moving average filter.

According to an embodiment, the first image may originate from a first original image cropped based on a position of the pupil of the eye in the first original image and the second image may originate from a second original image cropped based on a position of the pupil of the eye in the second original image.

The original images may be cropped, for example based on a position of a pupil of the user in the image, before determining whether an eye movement is in fixation or not. The original images may have been otherwise processed before determining whether an eye movement is in fixation or not, for example, by normalization of the images or adjusting of pixel intensities (for example, to remove shadows).

By processing images before determining whether an eye movement is in fixation or not, the computational complexity of the determination may be reduced, for example, by having fewer pixels to analyze (as in the case where the images are cropped) or by having fewer pixel differences (as in the case where pixel intensities are adjusted).

The determining may comprise determining a difference between a value of a pixel of the first image with a value of a corresponding pixel in the second image, and determining that the eye movement of the user's eye is in fixation on condition that an accumulated difference of pixel values of the images is below a predetermined threshold.

By comparing the images pixel by pixel, a relatively fast determination of whether the eye movement of the user's eye is in fixation or not, since objects (such as an eye, pupil, eyelid, etc.) in the images do not have to be identified.

The determining may comprise determining that a pixel has changed on condition that a difference between a value of the pixel in the first image and a value of the corresponding pixel in the second image is above a first predetermined threshold, and wherein the determining may further comprise determining that the eye movement of the user's eye is in fixation on condition that an accumulated number of changed pixels of the images is below a second predetermined threshold.

An example is to compare the absolute value of the pixel wise difference image and count the number of occurrences above a predetermined threshold, and if above, it may be determined that the eye movement of the user's eye is not in fixation.

The method may further comprise, on condition that less than a predetermined number of pixels in the first image have corresponding pixels in the second image, determining that the eye movement of the user's eye is non-fixated. Having a predetermined number of pixels in the first image have corresponding pixels in the second image may indicate that the images depict the same scene or view of the user, and thus, having less than a predetermined number of in the first image have corresponding pixels in the second image may indicate that the first and second images do not depict the same scene or view of the user. In that case, it may not be necessary to perform any further analysis on similarities of the images.

In this way, if there is not a sufficient number of pixels that are expected to correspond to the same scene, comparing pixel by pixel may be avoided, thereby saving computing resources.

The determining may comprise applying a machine learning logic. The machine learning logic may, for example, comprise a neural network, a regression tree, a gradient boosting repressor, or an AdaBoost repressor.

By using a machine learning logic, the logic for determining if the eye movement of the user's eye is in fixation or not does not have to be hard coded or defined in a specific algorithm, but the logic may learn and improve with more input data. The machine learning logic could, for example, compensate for an eye lid partly covering the eye, or another factor that may affect the determination. In the example of an eye lid partly covering the eye, the pixels between the images may be different because of the eye lid being present in one image but not in the other, but the position of the pupil in the image may still be the same. This may indicate that the user has not moved the eye between the images, even though some pixels have changed. Therefore, it may be correctly determined that the eye movement of the user is in fixation.

According to an embodiment, the determining may be further based on a previous determination that the eye movement of the user's eye is in fixation or not.

With very slow movements of the eye, the difference between two (consecutive) images may be so small that the eye movement of the user's eye is determined to be in fixation. However, over a longer period of time, there may be large enough movements of the eye of the user to constitute a movement of the user's eye, i.e. that the movements of the user's eye are not in fixation.

By basing the determining on a previous determination, a determination that a very slow movement is considered a fixation may be avoided, as previous values may be stored to help identify that the eye movement is not in fixation over a number of images.

The determining may be further based on a third image captured at a third point in time, the third point in time being before the first point in time and the second point in time, and wherein the third point in time and the first point in time are within a time period in which the eye movement of the user's eye is determined to be continuously fixated.

With very slow movements of the eye, the difference between two (consecutive) images may be so small that the eye movement of the user's eye is determined to be in fixation. However, over a longer period of time, there may be large enough movements of the eye of the user to constitute a movement of the user's eye, i.e. that the movements of the user's eye are not in fixation.

By basing the determining on a third image, many small movements of the user's eye that may image by image not be determined as movements, may be detected faster.

According to some embodiments, the first image and the second image originate from images captured by a camera arranged at a substantially fixed position relative to the user's eye when using the system.

When the camera is arranged at a substantially fixed position relative to the user's eye, then ideally, if there is a difference between a first image and a second image, the eyes will have moved. On the other hand, if there is no or a small difference between a first image and a second image, the eyes will not have moved. In examples where the camera is not fixed in relation to the eye, the image may change without the eyes having moved and the eyes may have moved without the gaze being focused on a different point since the head can be moved in relation to the camera and the eyes may then move to compensate for the moving of the head such that the gaze point is remained unchanged.

By having the first image and the second image originate from images captured by a camera arranged at a substantially fixed position relative to the user's eye when using the system, minimal or a reduced amount of processing of the images may be needed as changes in the image may indicate a movement of the eye.

According to a second aspect, a system for eye tracking is provided. The system may comprise a camera for capturing images of a user's eye and a processing unit configured to perform the method according to the first aspect.

The processing unit may be any type of multi-purpose processing means, such as a computer, a smartphone, a tablet or any other type of processing means suitable for receiving data from the camera. The processing unit may comprise a plurality of multi-purpose processing means, wherein different steps of the method may be performed by different processing means. The processing unit may, for example, be a processing unit comprised in an augmented reality or virtual reality device. The camera may be arranged at a substantially fixed position relative to the user's eye when using the system.

In this way, minimal or a reduced amount of processing of the images may be needed before applying the method according to the first aspect.

The system may be comprised in an augmented reality, AR, system or virtual reality, VR, system.

The AR or VR system may be wearable.

For example, the AR or VR system may be comprised in a pair of glasses. By having the AR or VR system wearable, the distance between parts of the system and the user, for example, between the camera and the user's eye, may be substantially the same during use. This may make the determination of whether the user's eye movement is in fixation or not easier, since the images may portrait substantially the same scene.

It is noted that embodiments of the invention relate to all possible combinations of features recited in the claims. Further, it will be appreciated that the various embodiments described for the method are all combinable with the system as defined in accordance with the second aspect of the present invention.

BRIEF DESCRIPTION OF DRAWINGS

This and other aspects will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION

Figure 1:
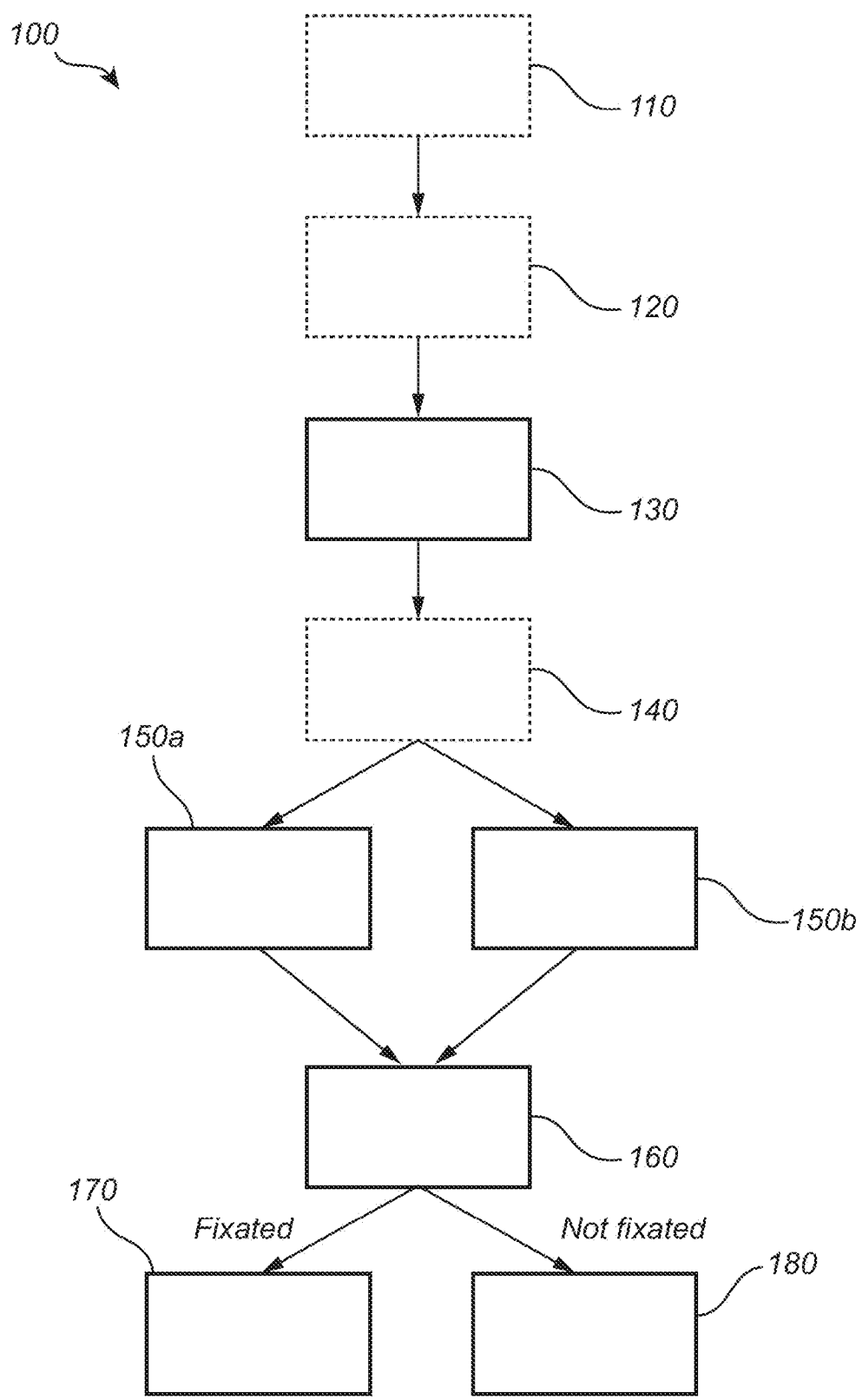
FIG. 1 shows a method for processing a gaze signal in an eye tracking system according to an embodiment.

A method for processing a gaze signal in an eye tracking system will be described with reference to FIG. 1. A gaze signal may be a signal indicating where a user is looking, such as an image of a user's eye, or any signal derived from the image such as for example pupil position, eye position, or gaze direction.

The dotted boxes indicate that the corresponding steps are optional. The method 100 comprises to receive 130 (or capture or obtain) a first image of a user's eye captured at a first point in time and a second image of the user's eye captured at a second point in time subsequent to the first point in time. The method 100 may comprise to obtain 110 a first and a second original image, and to crop or preprocess 120 the first and second original images to obtain the first and second images. The preprocessing may, for example, include cropping of the original image, adjusting of pixel intensities or normalization of the images. The first image may originate from a first original image cropped based on a position of the pupil of the eye in the first original image and the second image originates from a second original image cropped based on a position of the pupil of the eye in the second original image.

The first image and the second image may originate from images captured by a camera arranged at a substantially fixated position relative to the user's eye when using the system.

The method 100 may further comprise determining 160, based on the first image and the second image, whether eye movement of the user's eye is in fixation or not.

The determining 160 may further comprise, on condition that less than a predetermined number of pixels in the first image have corresponding pixels in the second image, determining that the eye movement of the user's eye is not in fixation, i.e. to determine an overlap between the first and the second image. By overlap it may be meant that the first and the second image are of the same scene. The first and second image may originate from a first original image and a second original image, respectively, which have been cropped. The cropping may be based on a position of a pupil in the original image. Thus, there may or may not be an overlap between the first and the second image (overlap is further described with reference to FIG. 2b).

It may be determined 140 that the user's eye movement is not in fixation if the overlap between the first and the second image is below a predetermined threshold. As an illustrative example only, if the images do not overlap with more than 50%, it may be determined that the eye movement of the user is not in fixation. In examples where the method is implemented in a wearable system, such as a virtual reality or augments reality system, the first and second image may depict only a pupil of the user. If the user's eye has moved between the first and the second image, the first and the second image may have little or no overlap as they are different fields in the field of view of the camera. This will be further explained with reference to FIG. 2b. The determining 160 may comprise determining 150a a difference between a value of a pixel of the first image with a value of a corresponding pixel in the second image, and the determining 160 may further comprise determining that the eye movement of the user's eye is in fixated fixation on condition that an accumulated difference of pixel values of the images is below a predetermined threshold.

Alternatively, the determining 160 may comprise determining 150b that a pixel has changed on condition that a difference between a value of the pixel in the first image and a value of the corresponding pixel in the second image is above a first predetermined threshold, and the determining 160 may further comprise determining that the eye movement of the user's eye is in fixated fixation on condition that an accumulated number of changed pixels of the images is below a second predetermined threshold.

The determining 160 may be performed based on a function of the first and second image, f(Image$_i$, Image$_{i+1}$). An example of such a function is to count the number of pixel wise differences between the first and second image where the pixel wise difference is above a predetermined threshold. For example, let $$g(\text{Image}_i, \text{Image}_{i+1}) = \sum_x \sum_y \gamma(\text{Image}_{i+1}[x, y] - \text{Image}_i[x, y])$$

where γ is an indicator function defined as $$\gamma(\Delta p) = \begin{cases} 1 & \text{if } |a| \geq \theta \\ 0 & \text{otherwise} \end{cases}$$

And where $\Delta p$ is the pixel wise difference and $\Theta$ is a predetermined threshold value. $\Theta$ could for example be set to a value in the interval 2 to 10, for example to 6.

The function f may be defined as the number of changed pixels between the two images being above or below a predetermined threshold:

$$f(\text{Image}_i, \text{image}_{i+1}) = \begin{cases} \text{fixation} & \text{if } g(\text{Image}_i, \text{Image}_{i+1}) \leq a \\ \text{not fixation} & \text{if } g(\text{Image}_i, \text{Image}_{i+1}) > a \end{cases}$$

Alternatively, f may be defined as a sum of absolute values of differences between pixels:

$$f(\text{Image}_i, \text{image}_{i+1}) = \\ \begin{cases} \text{fixation} & \text{if } \sum_x \sum_y \text{Image}_{i+1}[x, y] - \text{Image}_i[x, y] \leq a \\ \text{not fixation} & \text{if } \sum_x \sum_y \text{Image}_{i+1}[x, y] - \text{Image}_i[x, y] > a \end{cases}$$

α may for example be set to a value in the interval 10 to 40, for example to 20. If the method is implemented in an augmented reality (AR) or virtual reality (VR) system, such as a pair for VR or AR glasses, the first and second image may be captured from substantially the same distance and angle relative to the user. Because of the way the first and second images are captured, the first and the may be compared with minimal or no preprocessing. Thus, a change between the first and the second image may be due to a change in eye movement of the user.

Alternatively, or in combination with steps 140, 150a or 150b, the determining 160 may comprise applying a machine learning logic. The machine learning logic may, for example, comprise a neural network, a regression tree, a gradient boosting repressor, or an AdaBoost repressor. By using a machine learning logic, the logic for determining the if the eye movement of the user's eye is in fixation or not does not have to be hard coded or defined in a specific algorithm, but the logic may learn and improve with more input data. The machine learning logic could, for example, compensate for an eye lid partly covering the eye, or other factor that may affect the determination.

With very slow movements of the eye, the difference between two (consecutive) images may be so small that the eye movement of the user's eye is determined to be in fixation. However, over a longer period of time, there may be large enough movements of the eye of the user to constitute a movement of the user's eye, i.e. that the movements of the user's eye are not in fixation. Thus, a filter may be erroneously applied when the eye is moving. To prevent this, the determination 160 may be based on previous data.

The determining 160 may be further based on a previous determination that the eye movement the user's eye is in fixation or not. The previous determination that the eye movement, of the user's eye is in fixation or not may be within a time period in which it has continuously been determined that the eye movement of the user's eye is in fixation, i.e. that the movement of the user's eye is within a fixation period.

The determining 160 may be further based on a third image captured at a third point in time, the third point in time being before the first point in time and the second point in time, and, wherein the third point in time and the first point in time are within a time period in which the eye movement of the user's eye is determined to be continuously fixated.

The method 100 may further comprise, on condition that the eye movement of the user's eye is in fixation, applying 170 a filter on the gaze signal, wherein the filter is adapted to decrease variance in the gaze signal. The method 100 may further comprise, on condition that the eye movement of the user's eye is not in fixation, refrain 180 from, or stop, applying the filter on the gaze signal.

The filter may be any filter adapted to decrease variance in the gaze signal. For example, the filter may be a low-pass filter. One example of such a low-pass filter is to use an equally weighted average of all signals since the fixation period started. By using such a filter, the precision may gradually improve during the fixation. That is, the longer the fixation lasts, the better the precision may be.

Figure 2A:
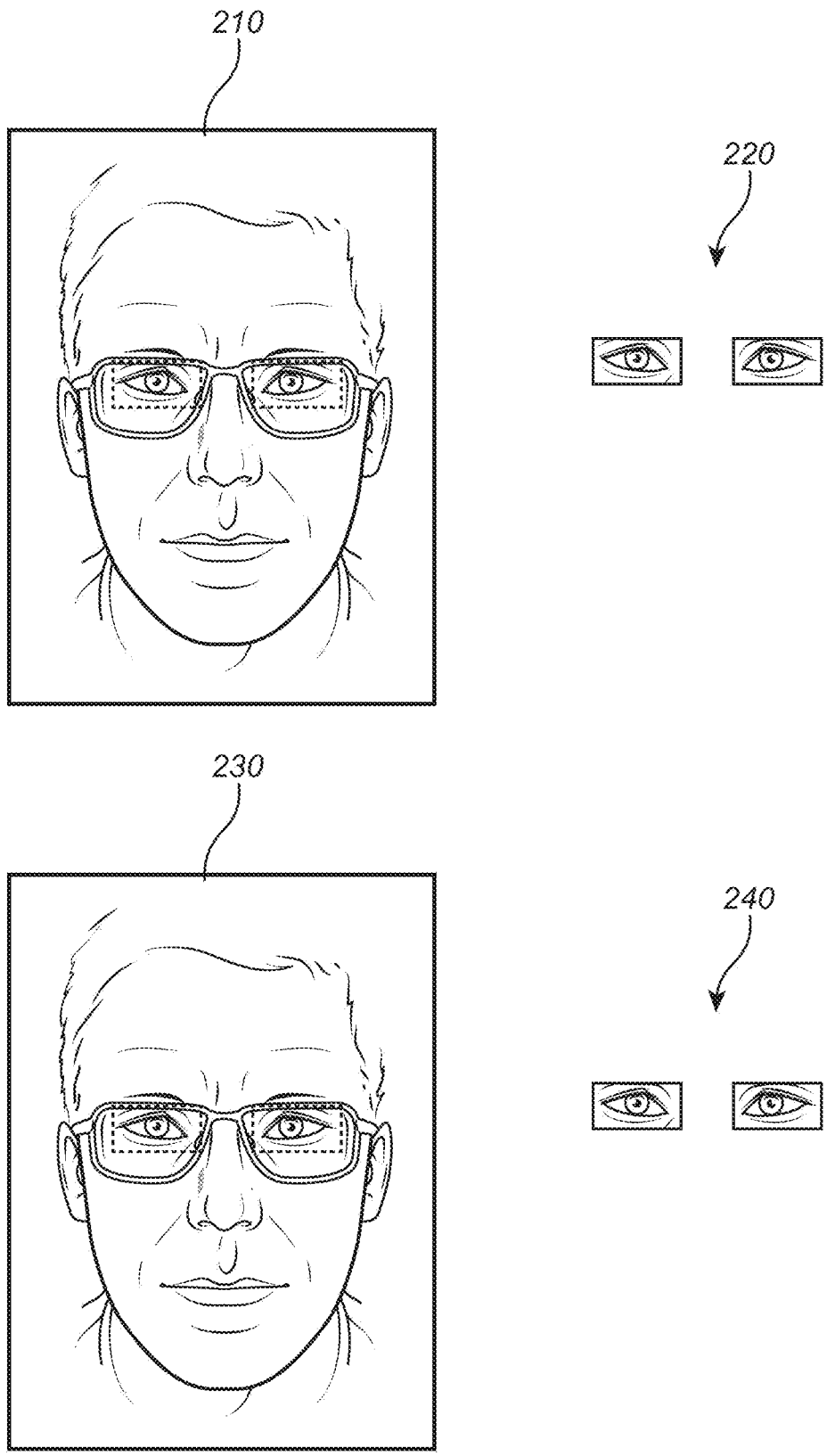
FIG. 2a and FIG. 2b shows illustrations of the first and second images according to an embodiment.

Illustrations of the first and second images are shown in FIG. 2a. A first original image 210 of a user of an eye tracking system may be obtained by a camera of the eye tracking system. The first original image 210 may be cropped into a first image 220, which in this example only includes the eyes of the user. In the same way, a second original image 230 of a user of an eye tracking system may be obtained by a camera of the eye tracking system. The second original image 230 may be cropped into a second image 230, which in this example only includes the eyes of the user. Preferably, the first image 220 and the second image 230 correspond to the same scene, in this example the eyes of the user.

Figure 2B:
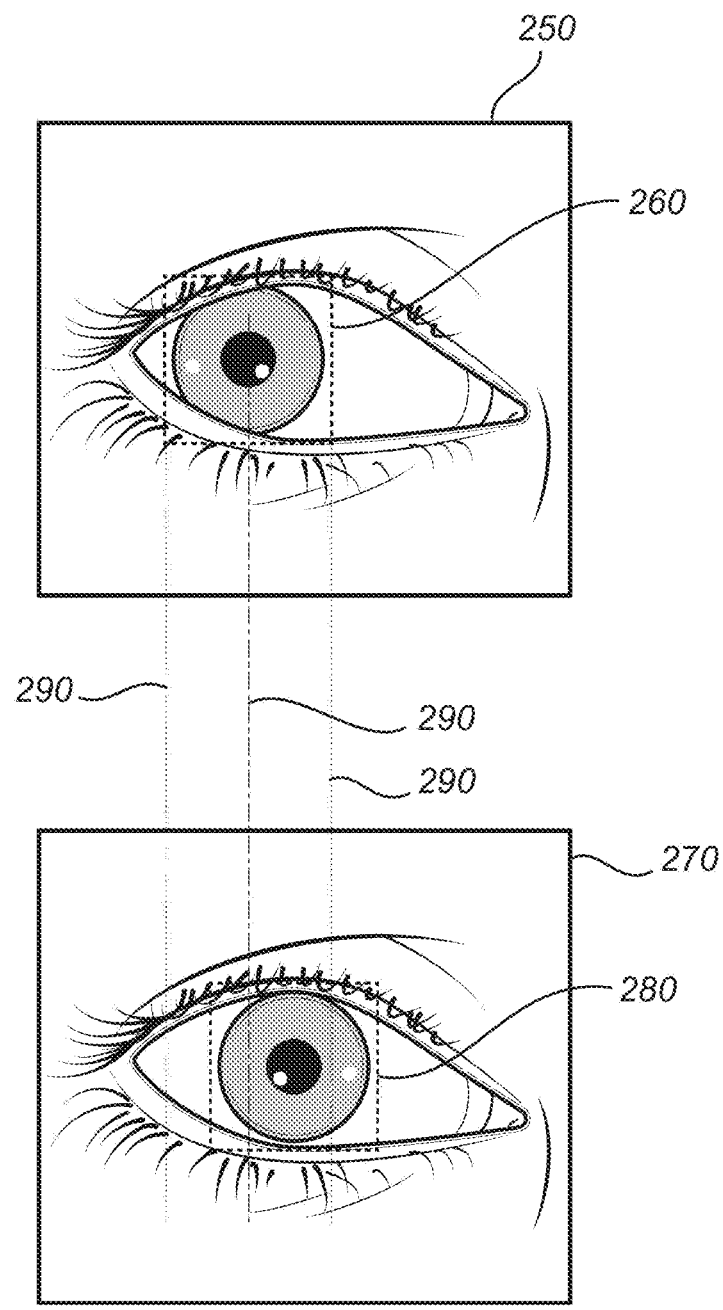

Illustration of the first and second images captured by a camera in a wearable system are shown in FIG. 2b. A first original image 250 and a second original image 270 of a user's eye may be obtained by the camera. The images may be cropped based on the position of the user's eye in the respective original image to obtain a first image 260 and a second image 280. The first image 260 and the second image 280 may have an overlap in position in the original images, as indicated by the dotted lines 290. In cases where the images are cropped based on the position of the user's eye in the respective original image, the overlap will depend on how much the eye has moved between capturing the first original image and the second original image.

In examples where the first and second image are captured by a camera arranged in a wearable AR or VR system, the first original image and the second original image may be substantially identical except for any eye movements since they are captured from the same distance and at the same angle from the user's eyes. In an AR or VR system, the first image and the second image may be the same as the first original image and the second original image, respectively.

Figure 3:
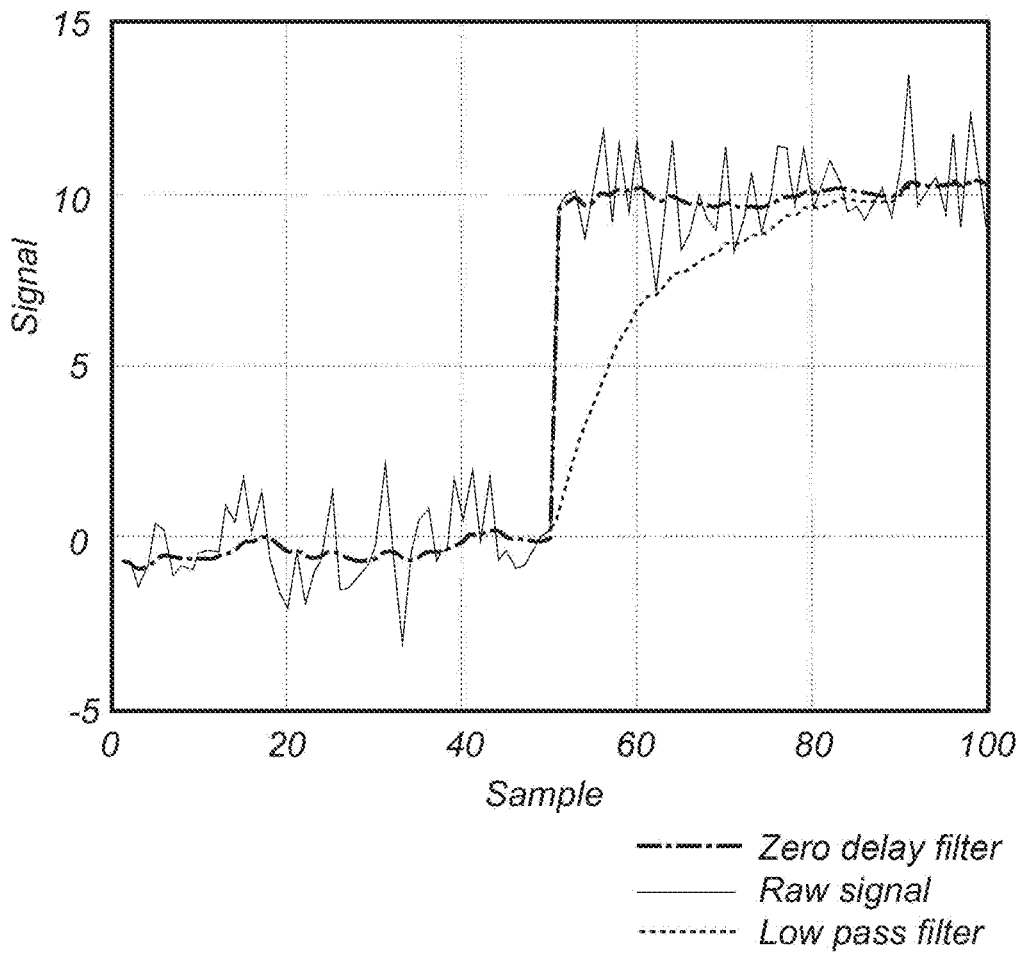
FIG. 3 shows an example of a comparison of a static low-pass filter and the method described with reference to FIG. 1 applied to the same signal disturbed by noise.

An illustrative example of a comparison of a static low-pass filter and the method described with reference to FIG. 1 applied to the same signal disturbed by noise is shown in FIG. 3. It is evident that there is no delay added to the signal when using the method described with reference to FIG. 1, and that the precision is increased.

Figure 4:
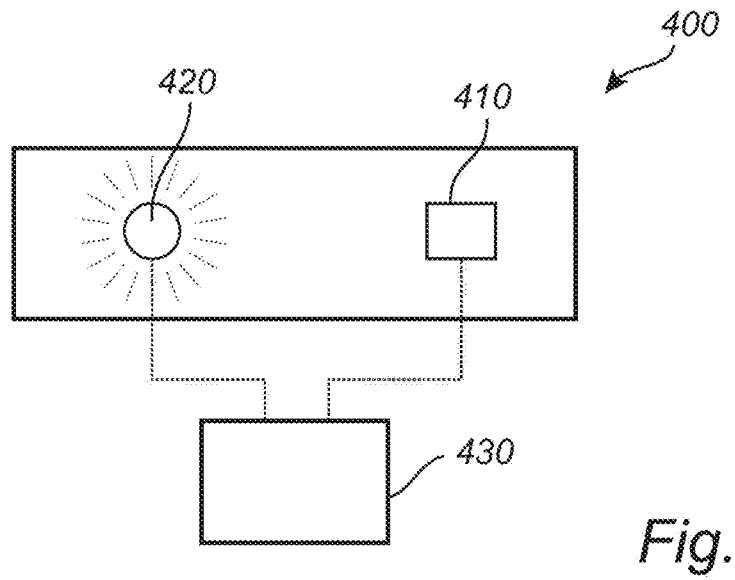
FIG. 4 shows a system for determining a gaze direction according to an embodiment.

A system for determining a gaze direction according to an embodiment will be described with reference to FIG. 4. FIG. 4 shows a schematic view of a system 400 for determining a gaze direction. The system 400 comprises a camera 410 and a processing unit 430. The system 400 may further comprise an illuminator 420.

The processing unit may be adapted to perform some or all of the steps of the method described with reference to FIG. 1. The processing unit 430 may be any type of multi-purpose processing means, such as a computer, a smartphone, a tablet or any other type of processing means suitable for receiving, data from the camera 410.

Figure 5:
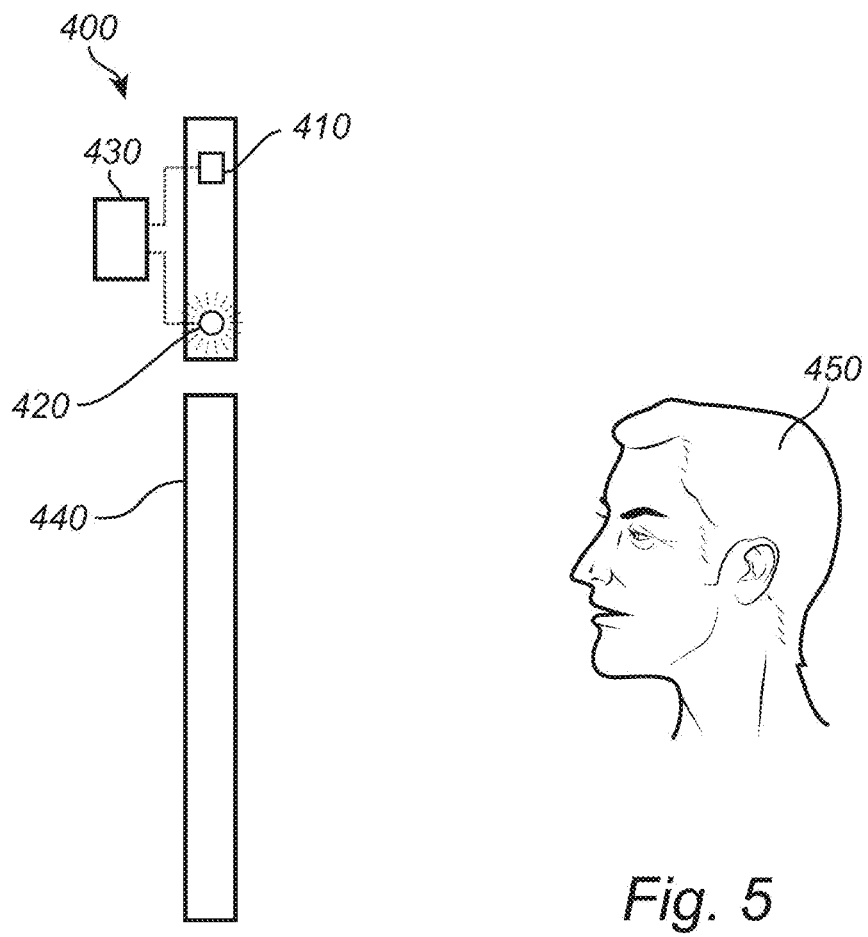
FIG. 5 shows a schematic view of a system for processing a gaze signal in an eye tracking system used by a user viewing a scene.

FIG. 5 shows a schematic view of a system 400 for processing a gaze signal in an eye tracking system 400 used by a user 450 viewing a scene 440. The scene 440 may, for example, be a monitor, a screen, a smartphone or a tablet, or another device displaying information. The system 400 may, for example, be comprised in a pair of augmented reality, AR, glasses.

The camera 410 may capture a first image and a second image of the user 450 including at least one of a user's 450 eyes. The camera 410 may be arranged at a substantially fixed position in relation to the user 450. By having the camera 410 arranged at a substantially fixed position in relation to the user 450, the first and the second images may portrait substantially the same scene or image.

The scene 440 may be connected to the processing unit 430. By having the scene 440 connected to the processing unit 430, the processing unit 430 may control and/or receive information from the scene 440. For example, the processing unit 430 may control and/or receive information regarding a calibration pattern displayed on the scene 440.

Figure 6:
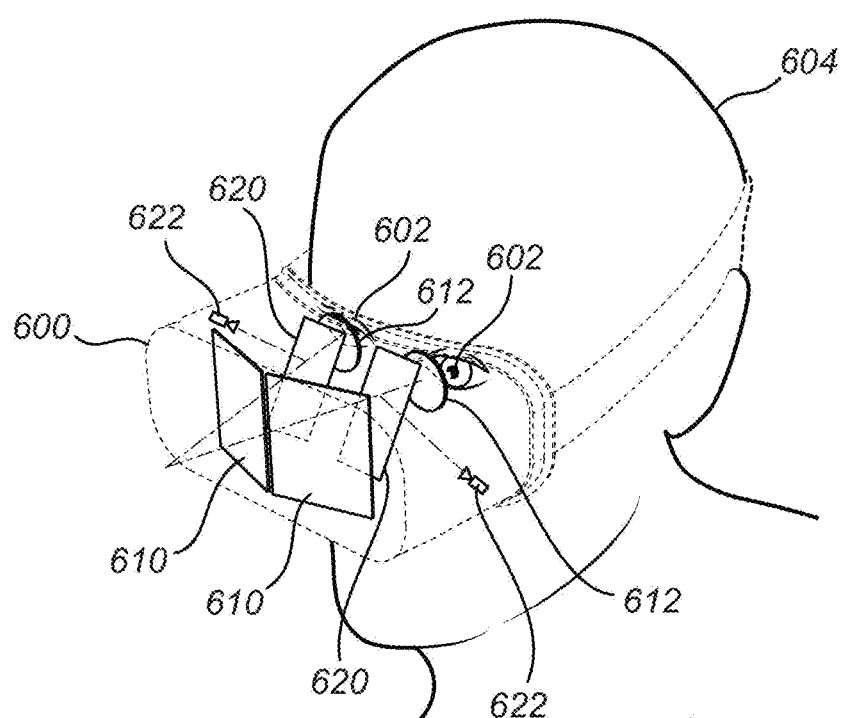
FIG. 6 shows a schematic view of a system for processing a gaze signal in an eye tracking system used by a user, the system comprising a head mounted device.

FIG. 6 shows a schematic view of a system 600 for processing a gaze signal in an eye tracking system 600 used by a user 604. In this example, the eye tracking system comprises a head mounted device in the form of the VR glasses 600. In addition to the VR glasses 600, eyes 602 and a head 604 of a user are shown. The VR portion of the VR glasses 400 shown comprises two VR displays 610 and two lenses 612, one VR display 610 and one lens 612 for each eye 602. The VR displays 610 are positioned in front of the eyes 612 and the lenses 614 are positioned between the eyes 612 and the VR displays 610. The eye tracking portion of the VR glasses 600 comprises two hot mirrors 620 and two cameras 622. In order to capture images of the eyes 612 for use in eye tracking, the hot mirrors 620 are arranged between the VR displays 610 and the lenses 614. Furthermore, illuminators (not shown) are arranged on or in the VR glasses 600 such that illumination rays are directed towards the eyes 602. Reflections from the eyes 602 of the illumination rays towards the hot mirrors 620 will reflect towards the cameras 622 in which the illumination rays are detected to produce an image of the eye. For example, the hot mirrors 620 may be of a type such that they will reflect light in the infrared frequency band but be transparent for light in the visible frequency band. The illuminators (not shown) used would then produce illumination rays in the infrared frequency band and the cameras 622 will include image sensors able to detect light in the infrared frequency band.

The system 600 may further comprise a processing unit similar to the processing unit described with reference to FIG. 4.

The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

The invention claimed is:

1. A method for processing a gaze signal in an eye tracking system, the method comprising:
   receiving a first image of a user's eye captured at a first point in time and a second image of the user's eye captured at a second point in time subsequent to the first point in time;
   determining, based on the first image and the second image, whether eye movement of the user's eye is in fixation or not, wherein the determining comprises ascertaining that a pixel has changed on condition that a difference between a value of the pixel in the first image and a value of the corresponding pixel in the second image is above a first predetermined threshold, and
   wherein the determining further comprises ascertaining that the eye movement of the user's eye is in fixation on condition that an accumulated number of changed pixels of the images is below a second predetermined threshold;
   on condition that the eye movement of the user's eye is in fixation, applying a filter on the gaze signal, wherein the filter is adapted to decrease variance in the gaze signal.

2. The method according to claim 1, further comprising, on condition that the eye movement of the user's eye is not in fixation, refrain from applying the filter on the gaze signal.

3. The method according to claim 1, wherein the filter is a low-pass filter.

4. The method according to claim 1, wherein the first image originates from a first original image cropped based on a position of the pupil of the eye in the first original image and the second image originates from a second original image cropped based on a position of the pupil of the eye in the second original image.

5. The method according to claim 1, wherein the determining comprises determining a difference between a value of a pixel of the first image with a value of a corresponding pixel in the second image, and wherein the determining further comprises determining that the eye movement of the user's eye is in fixation on condition that an accumulated difference of pixel values of the images is below a predetermined threshold.

6. The method according to claim 1, wherein, on condition that less than a predetermined number of pixels in the first image have corresponding pixels in the second image, determining that the eye movement of the user's eye is non-fixated.

7. The method according to claim 1, wherein the determining comprises applying a machine learning logic.

8. The method according to claim 1, wherein the determining is further based on a previous determination that the eye movement the user's eye is in fixation or not.

9. The method according to claim 1, wherein the determining is further based on a third image captured at a third point in time, the third point in time being before the first point in time and the second point in time, and wherein the third point in time and the first point in time are within a time period in which the eye movement of the user's eye is determined to be continuously fixated.

10. The method according to claim 1, wherein the first image and the second image originate from images captured by a camera arranged at a substantially fixated position relative to the user's eye when using the system.

11. A system for eye tracking, comprising:
a camera for capturing images of a user's eye;
a processing unit configured to perform the method of:
- receiving a first image of a user's eye captured at a first point in time and a second image of the user's eye captured at a second point in time subsequent to the first point in time;
- determining, based on the first image and the second image, whether eye movement of the user's eye is in fixation or not, wherein the determining comprises ascertaining that a pixel has changed on condition that a difference between a value of the pixel in the first image and a value of the corresponding pixel in the second image is above a first predetermined threshold, and
- wherein the determining further comprises ascertaining that the eye movement of the user's eye is in fixation on condition that an accumulated number of changed pixels of the images is below a second predetermined threshold;
- on condition that the eye movement of the user's eye is in fixation, applying a filter on the gaze signal, wherein the filter is adapted to decrease variance in the gaze signal.

12. The system according to claim 11, wherein the camera is arranged at a substantially fixed position relative to the user's eye when using the system.

13. The system according to claim 11, comprised in an augmented reality, AR, system or virtual reality, VR, system.

14. The system according to claim 13, wherein the AR or VR system is wearable.

* * * * *